United States Patent [19]
Lloyd et al.

[11] 3,889,053

[45] June 10, 1975

[54] CONTACTLESS TEST SYSTEM

[75] Inventors: Raymond A. Lloyd, Laurel; William L. Hrybyk, Linthicum, both of Md.

[73] Assignee: Westinghouse Electric Corporation, Pittsburgh, Pa.

[22] Filed: Oct. 30, 1973

[21] Appl. No.: 411,116

[52] U.S. Cl........ 178/6; 178/DIG. 37; 350/160 LC; 178/6.8

[51] Int. Cl............................................. H04n 7/18

[58] Field of Search.................. 178/DIG. 37, 6, 6.8; 350/160 LC

[56] References Cited

UNITED STATES PATENTS

| | | | |
|---|---|---|---|
| 2,895,049 | 7/1959 | Astheimor et al. | 250/316 |
| 3,049,588 | 8/1962 | Barnett | 178/6 |
| 3,283,148 | 11/1966 | Schwarz et al. | 250/316 |
| 3,533,399 | 10/1970 | Goldberg | 128/2 |
| 3,718,757 | 2/1973 | Gulitz | 178/6.8 |
| 3,798,366 | 3/1974 | Hunt et al. | 178/6.8 |

OTHER PUBLICATIONS

Barnes Engineering Bulletin 12-1600, issued by the Barnes Engineering Co. (5-63).

E. M. Johnson, "Apparatus for Utilizing Liquid Crystals to Sense Flaws in Printed Ckt." 11/7/73, Western Electric p. 29.

*Primary Examiner*—Howard W. Britton
*Assistant Examiner*—Edward L. Coles
*Attorney, Agent, or Firm*—J. B. Hinson

[57] ABSTRACT

A system for checking the operational status of individual members of a class of electric circuits is disclosed. The operational status of the circuit being inspected is determined by comparing the temperature patterns of the circuit being inspected with the temperature pattern of a similar circuit known to be free of operational defects. An operational circuit of the class to be inspected is coated with a cholesteric liquid crystal to convert the temperature patterns of the surface of the circuit to color pattern. A black and white TV camera is focused on the circuit. The video signal generated by the TV camera is sampled and the samples are digitized to generate a series of digital numbers which are stored in a memory. The circuit to be inspected is similarly coated with the liquid crystal, the TV camera is focused on the circuit to be inspected and the video signal generated by the TV camera is sampled and digitized to generate a second series of numbers which are also stored in a memory. Corresponding members of the first and second series of numbers are then compared by a digital computer to determine areas of the circuit in which intensity of the temperature patterns are abnormal. Any normal temperature patterns are analyzed to determine if the abnormality is significant. A signal is generated indicating that the circuit is defective if a significant abnormality is found.

9 Claims, 6 Drawing Figures

PATENTED JUN 10 1975 3,889,053

SHEET 2

LEGEND:
$ = 1
+ = 2
− = 3
■ = 4
BLANK = 5

LEGEND:
$ = 1
+ = 2
− = 3
■ = 4
BLANK = 5

LEGEND:
$ = 1
+ = 4
− = 3
■ = 2
BLANK = 0

PATENTED JUN 10 1975 3,889,053

SHEET 5

LEGEND:
$ = 1
+ = 2
— = 3
■ = 4
BLANK = 5

CONTACTLESS TEST SYSTEM

BACKGROUND OF THE INVENTION

1. Field of the Invention

The invention relates to testers and more particularly to contactless testers utilizing liquid crystals to detect the temperature pattern of circuits being tested and TV cameras to compare the temperature pattern of a circuit known to be free of defects to the temperature pattern generated by the circuit being tested.

2. Discussion of the Prior Art

Several articles and papers have been presented on the theoretical feasibility of using infrared in a test system to determine the integrity of electric circuits. A few of these systems have actually been built. One limitation of these systems has been in infrared scanning techniques that were used to generate the thermal profile of the subject under investigation. With these prior art systems a profile was obtained by attaching the subject device (usually a printed circuit board) to the surface of an X-Y positioner and aligning the start point of the area to be scanned to the focal point of the infrared detector. Stimulus is applied, and the device is moved in a scan trajectory relative to the focal point of the infrared detector by the X-Y positioner. At the end of the trajectory scan, the subject is indexed and scanned in the same plane. This method is continued until the total surface of the subject has been scanned by the infrared detector. The X-Y positioner is controlled by a series of stepping motors that typically have a maximum of 100 steps per second, with each step consisting of tem mils of motion. The results of this method of scanning were long time periods required to scan the subject. A typical example is a small 4.5 inches × 4.5 inches printed circuit board. To scan 4.5 inches at maximum stepping rate would require 4.5 seconds. (This is for one plane only.) This would have to be repeated 450 times to scan the second plane or a total of 2,025 seconds, to scan the total surface of the board. Typical prior art systems are discussed in the following articles: (A) "Infrared for Electronics Equipment Diagnosis" by J. F. Stoddard. Raytheon Co. August 1968; (B) "An Infrared Tester for Printed Circuit Boards and Microcircuits" by R. W. Jones. Autonetics Division of North American Rockwell Corp. August, 1968.

As far as is known, no prior art efforts have been directed toward using liquid crystals to convert the heat patterns generated to visible signals and utilizing a TV camera to convert these patterns to video signals which are analyzed to determine the operational status of the circuit being tested.

SUMMARY OF THE INVENTION

The invention includes apparatus for detecting the temperature pattern generated by an electronic circuit being tested and for analyzing this pattern to determine if the circuit is operating properly. The basic procedure utilized is to select a properly operating member of the class of circuits to be tested as a reference circuit. The reference circuit is coated with a thin layer of cholesteric liquid crystal, positioned in a fixture and normal bias voltages and selected input signals are coupled to the circuit. The surface of the reference circuit is examined by a black and white TV camera to generate a video signal related to the temperature gradient of the surface of the reference circuit. The video signal is sampled and each sample is digitized to generate a first array of digital numbers with the magnitude of each of these numbers being proportional to the temperature of a specific portion of the surface of the circuit. These digital numbers are then stored in a digital memory.

The circuit to be tested is similarly coated, placed in the fixture and provided with bias and input signals substantially identical to those previously applied to the reference circuit. The surface of the circuit under test is then examined by the TV camera to generate a second video signal related to the temperature gradient of the surface of the circuit under test. This second video signal is sampled and each sample is digitized by an analog-to-digital converter to generate a second array to digital numbers with the magnitude of each of these numbers being related to the temperature of specific areas of the circuit being tested. These numbers are also stored in the digital memory.

A digital processor reads the first and second array of digital numbers from the memory and compares corresponding elements of the first and second arrays to generate a third array of digital numbers. Each element of the third array is proportional to the difference between corresponding members of the first and second arrays. This third array of numbers is then statistically analyzed to indicate areas where the temperature of the surface of the circuit under test is significantly different from the surface temperature of corresponding portions of the reference circuit. The existence of significant differences indicates that the circuit under test is not functioning properly.

If the circuit under test is found to be faulty the temperature variations can be further analyzed to actually determine or aid in determining which component of the circuit under test may be faulty. The degree to which this analysis can be carried will in general depend on the type of circuitry being tested.

In the disclosed system the operational parameter used to detect improper operation is the temperature gradient of the surface of the circuit being tested. Other parameters such as magnetic field may be used by substituting suitable magnetic detecting means for the infrared camera.

DETAILED DESCRIPTION OF THE INVENTION

Figure 1:
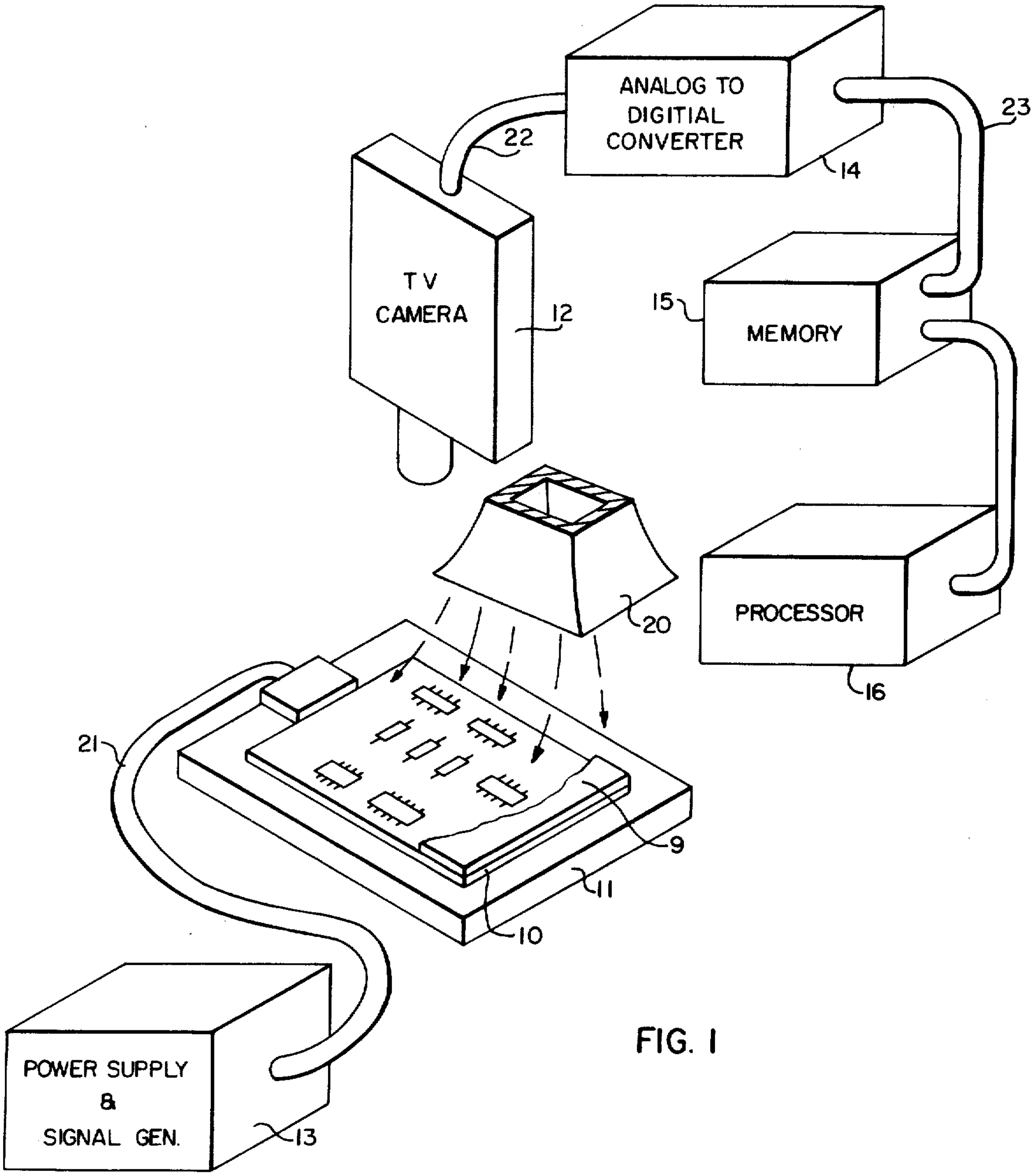
FIG. 1 is a drawing illustrating the functional components of the system.

A diagram illustrating the components of the preferred embodiment of the system is shown in FIG. 1. The circuit 10 to be tested is coated with a thin layer of cholesteric liquid crystal 9 and positioned on a fixture 11. The fixture 11 is designed such that the circuit 10 is supported in a predetermined position with respect to a black and white TV camera 12. Bias and test input signals are provided to the circuit 10 by a power supply and signal generator 13. The video signals generated by the TV camera 12 are sampled and digitized by an analog-to-digital converter 14 to generate an array of numbers indicative of the temperature gradient of the surface of the circuit 10 under test. The digital numbers generated by the analog-to-digital converter are stored in a memory 15. The contents of the memory 15 are analyzed by a processor 16 to generate signals indicative of the operational status of the circuit board under test 10. Air from an air duct 20 is passed over the circuit board 10. Air may be supplied to air duct 20 by any convenient means. This prevents the temperature gradient of the surface of the circuit from becoming distorted due to heating of the air masses adjacent the circuit components.

In operation, a circuit 10 which is a member of the class of circuits to be tested and known to be in proper operating condition is coated with a thin layer of cholesteric liquid crystal 9 and positioned in the fixture 11. This circuit is referred to as the reference circuit. The power supply and signal generator 13 is coupled to the reference circuit by a cable and connector assembly 21. The air supply (not shown) is energized to provide a constant air flow through the air duct 20.

As the various areas of the circuit 10 change temperature, the thin layer of cholesteric liquid crystal 10 generates a visable color pattern related to the heat pattern associated with the circuit 10. When the temperature stabilizes, the color pattern will stabilize and be indicative of the temperature gradient of the surface of the circuit. The TV camera, the analog-to-digital converter 14, the memory 15, and the processor 16 are energized. The TV camera 12 is focused on the circuit board 10. The video output signal of the TV camera is coupled to the analog-to-digital converter 14 by a cable 22. The analog-to-digital converter 14 samples and digitizes the video signal generated by the TV camera 12 to generate a first array of digital numbers, illustrated by symbols in FIG. 2. Each of these numbers is substantially proportional to the temperature of corresponding portions of the circuit 10 because the response by the TV camera is substantially linear over the visible spectrum. Suitable techniques for sampling and digitizing TV signals are well known in the prior art.

A five level digital code has been found to provide sufficient resolution. The five level code also permits a simple analog-to-digital converter to be used and limits the number of bits in the digital data word to three. Reducing the number of bits in the data word reduces the memory and data processing requirements.

Figure 2:
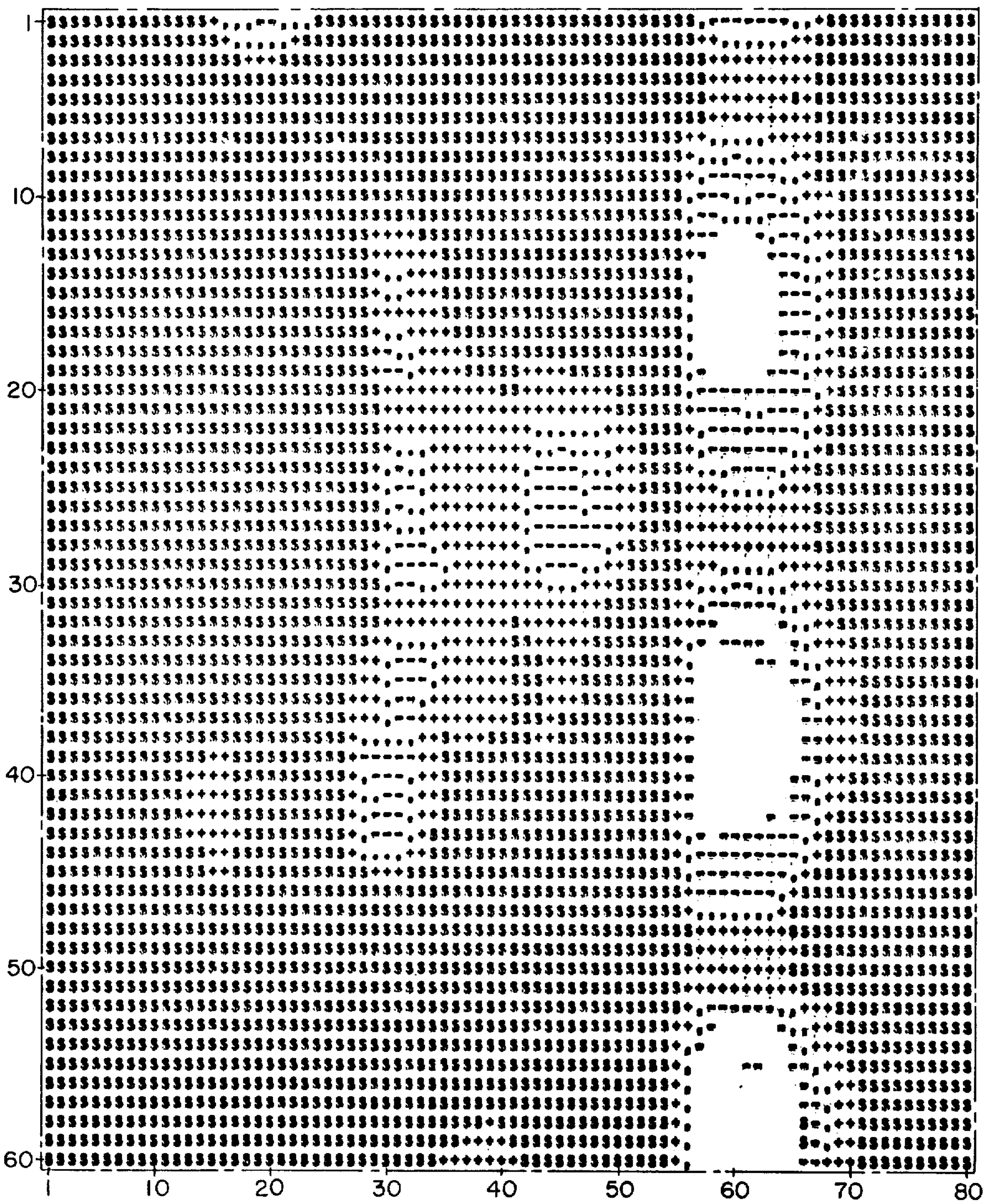
FIG. 2 is a typical array generated by scanning the reference circuit.

Symbols are used instead of numbers in all of the illustrations of the arrays of numbers. This aids in visually analyzing the arrays. The array illustrated in FIG. 2 is indicative of the temperature distribution of the top surface of the circuit 10. Since the circuit 10 is known to be in proper operating condition this array of numbers will be used as reference data and compared to similar data generated by examining a circuit to be tested.

Figure 3:
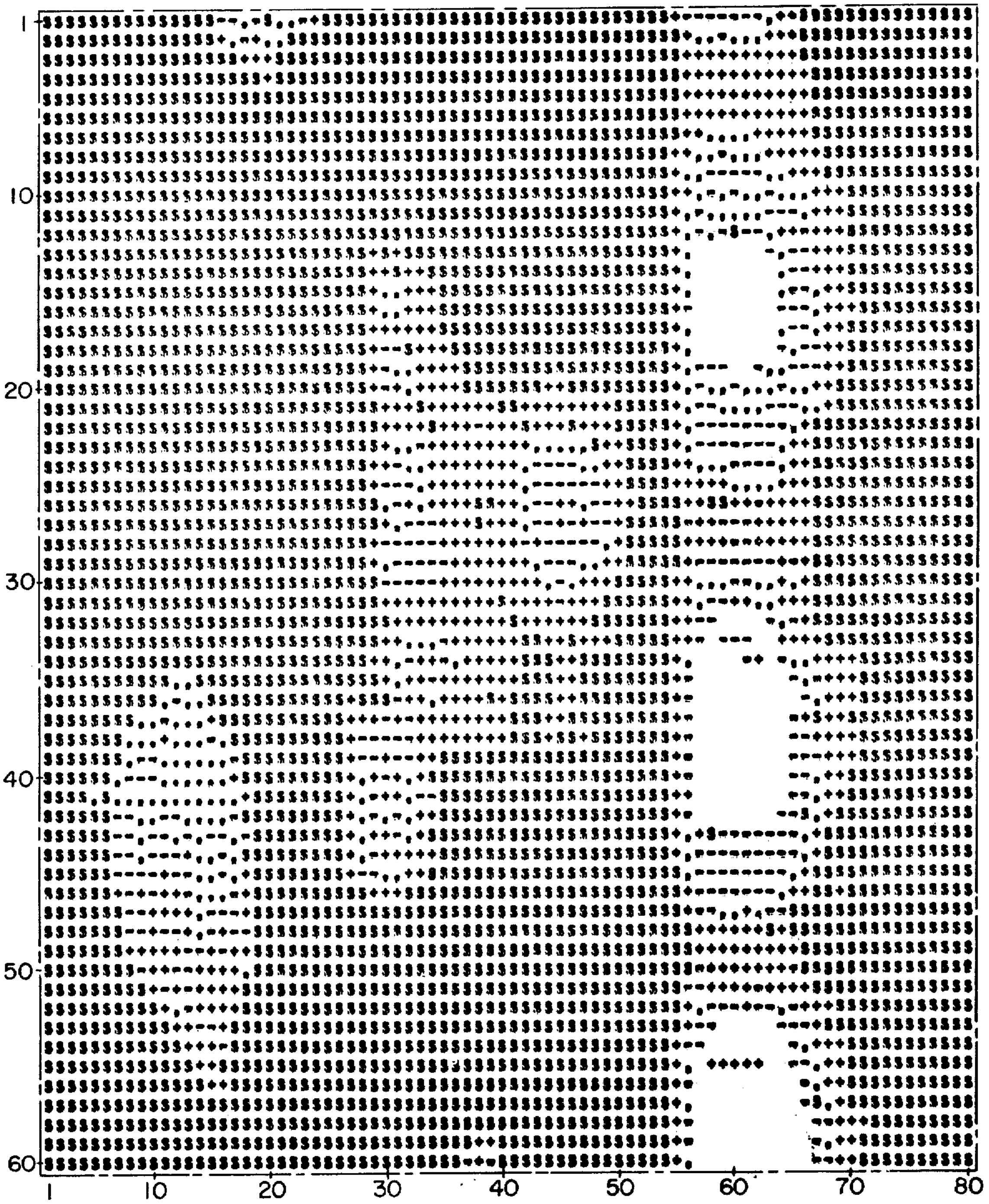
FIG. 3 is a typical array generated by scanning the circuit under test.

The reference circuit used to generate the first array of numbers is removed from the test fixture 11 and a circuit to be tested is similarly coated with a thin layer of cholesteric liquid crystal and placed in the fixture 11. This circuit is coupled to the power supply and signal generator 13 by the cable assembly 21. The TV camera 12 is focused on the circuit to be tested and a second array of numbers is generated by sampling and digitizing the video output signals of the TV camera 12. These numbers are stored in the memory 15, as previously described. The second array of numbers is illustrated by symbols in FIG. 3. The digital processor 16 reads the first and second arrays of numbers illustrated in FIGS. 2 and 3 and subtracts each element of the second array from the corresponding element in the first array to generate a new array of numbers indicative of the difference between the two arrays. This new array of numbers is illustrated in FIG. 4.

The differences in temperature of various areas of the circuit can result from either normal variation in the components comprising the circuit or abnormal operating conditions. Therefore it is necessary to analyze the differences illustrated in FIG. 4 to determine which of these differences are significant.

Figure 4:
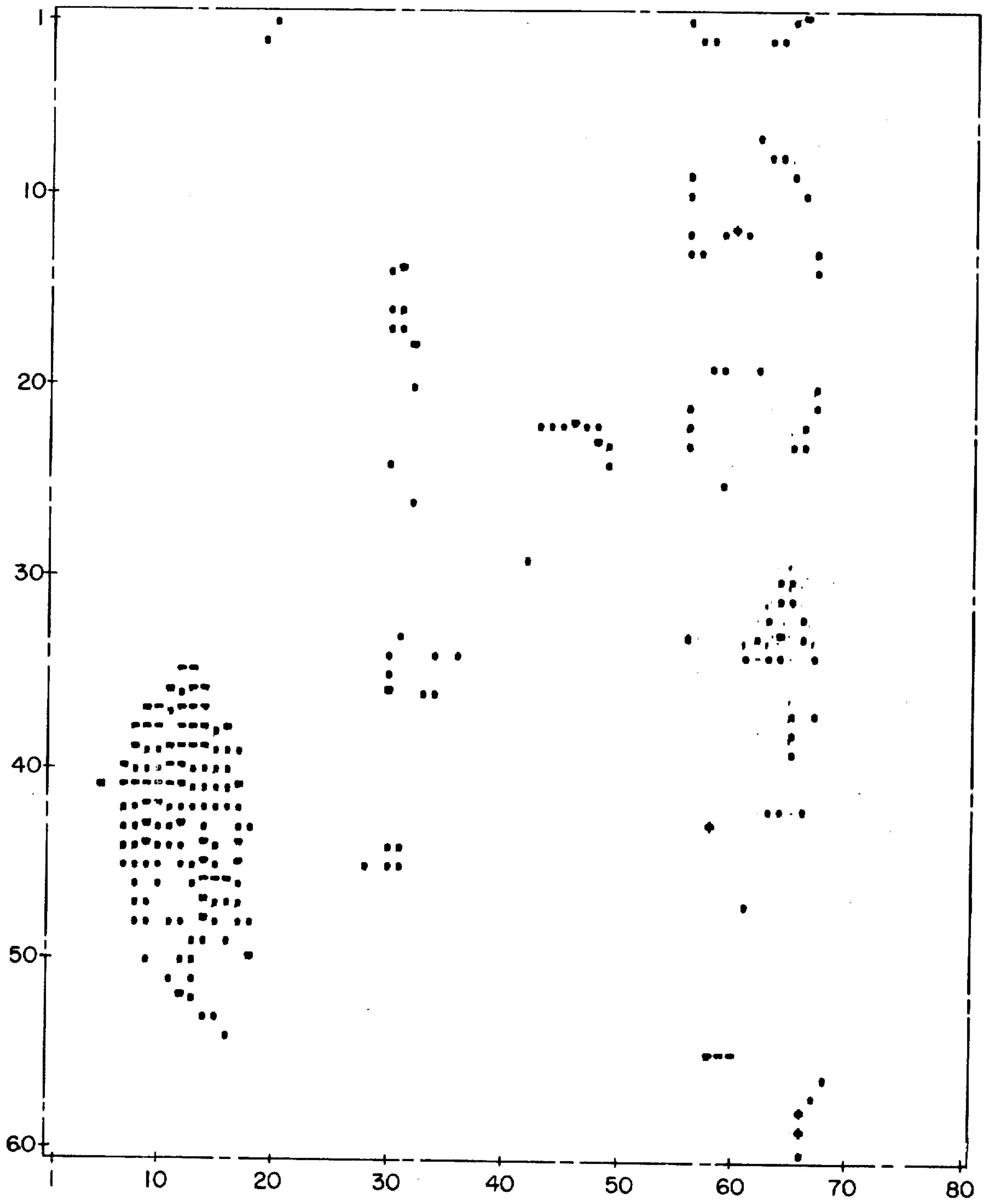
FIG. 4 is an array proportional the difference between the arrays illustrated in FIGS. 2 and 3.
Figure 5:
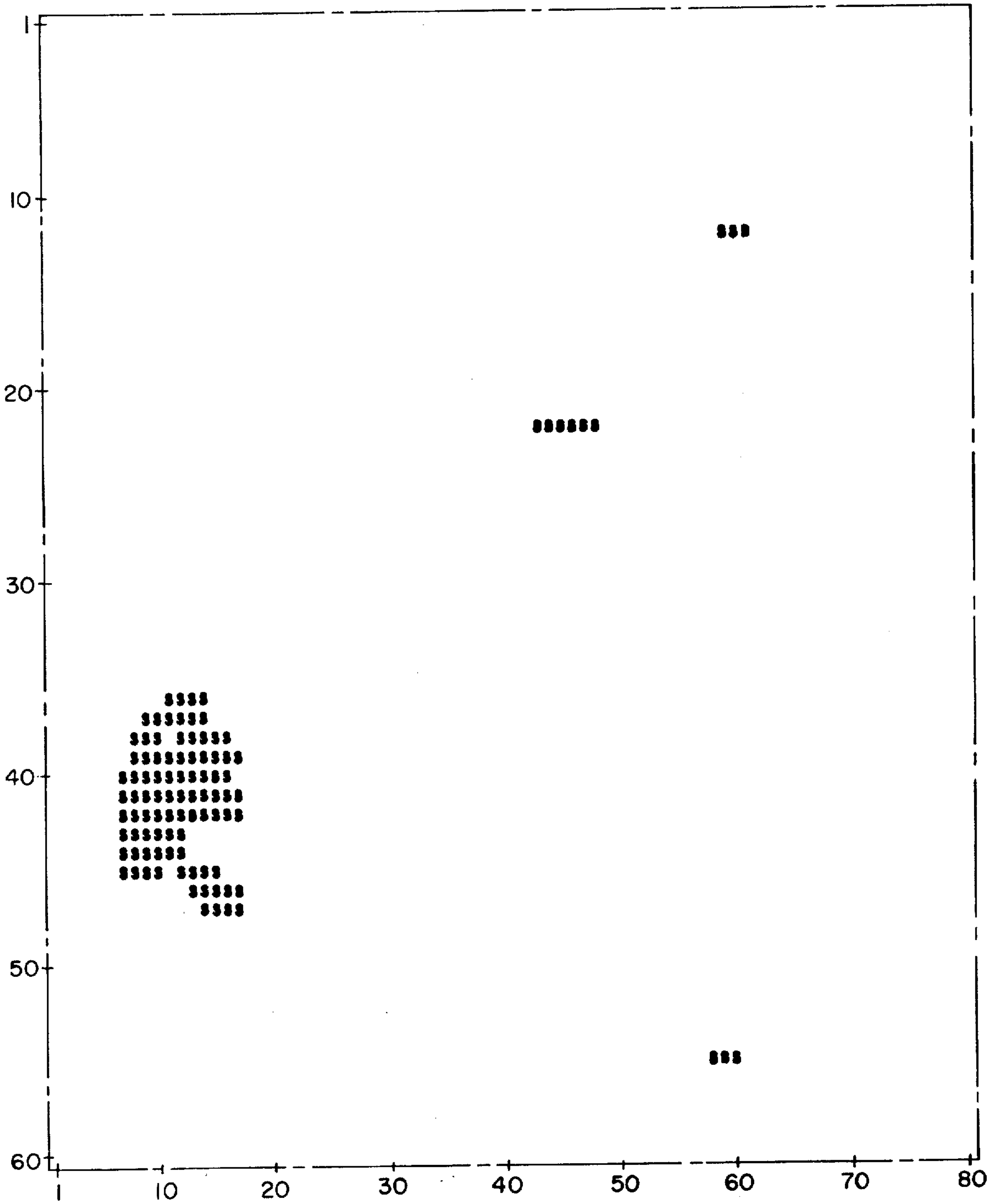
FIG. 5 is an array indicating which of the elements of the array illustrated in FIG. 4 are significant.

One statistical criteria found to be useful in analyzing the data is to analyze the array illustrated in FIG. 4 on a line-by-line basis in the horizontal direction. Only those areas where there is a difference in at least three adjacent elements are considered to be significant. The array of numbers illustrated in FIG. 4 was processed in this manner. A dollar sign was used to indicate points of the array which meet this criteria and the resulting array is shown in FIG. 5. The array of FIG. 5 was superimposed on a line outline of the components comprising the circuit being tested. The result is shown in FIG. 6 with the outer dimensions of each circuit component being indicated by segments of a straight line.

The circuits tested to generate the arrays used in this application consisted of integrated circuits and resistors. The integrated circuits are identified in FIG. 6 by the symbol IC followed by an identification number. The resistors are similarly identified by the symbol R.

It should also be noted that the circuit being tested can be examined in parts. This is illustrated in FIG. 6 by the fact that only portions of IC1, IC2 and IC5 are within the view of the camera.

Figure 6:
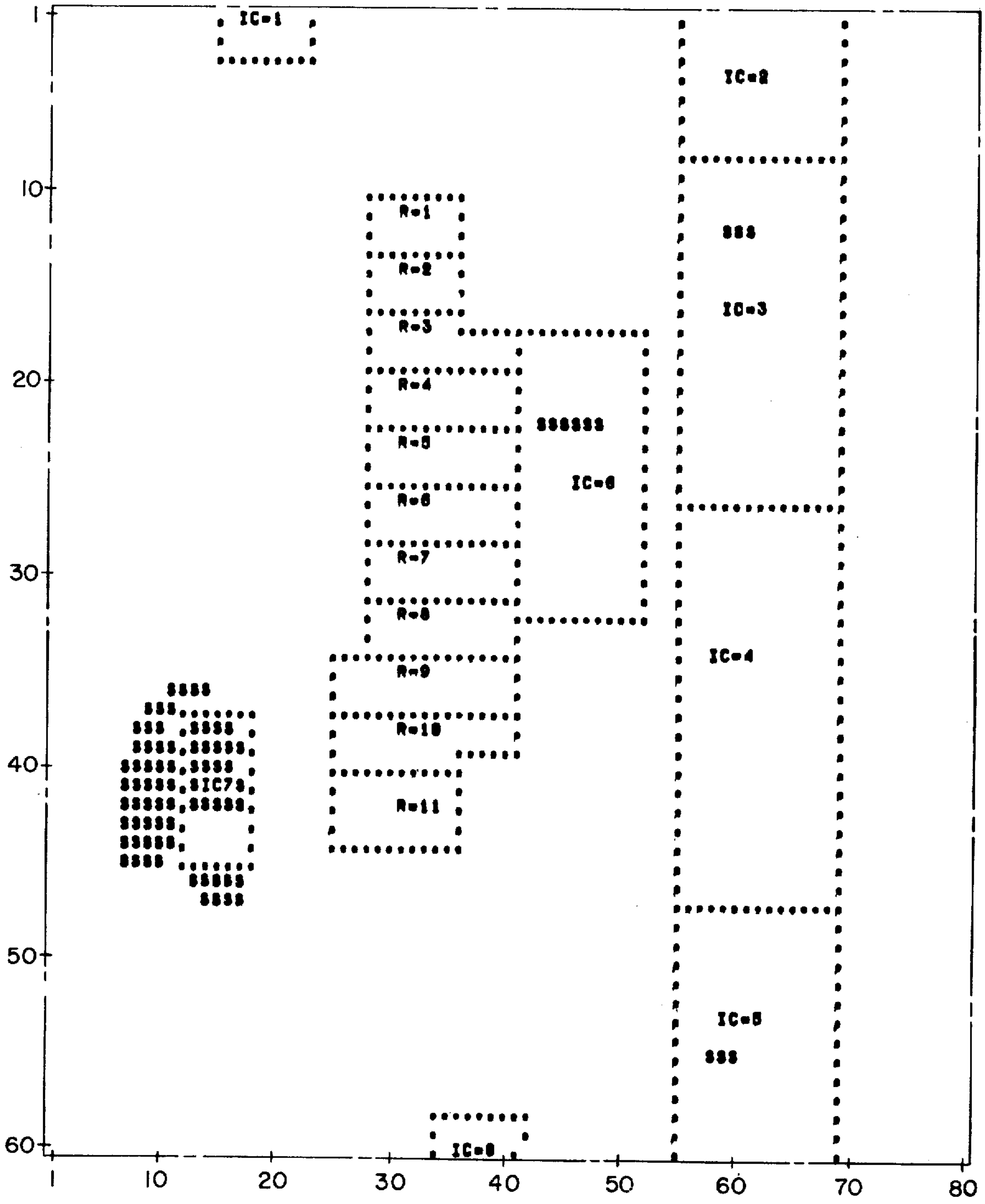
FIG. 6 is the array illustrated in FIG. 5 superimposed on an outline of the circuit component comprising the circuit being tested.

FIG. 6 indicates that the major difference between the temperature distribution of the reference circuit and the circuit being tested is due to an integrated circuit, IC7 illustrated in the lower lefthand corner of FIG. 6. This difference was in fact generated by introducing a fault in integrated circuit IC7. The difference in the temperature of integrated circuits IC6, IC3 and IC5 was the result of a slight alteration in the operating characteristics of this integrated circuit due to the fault introduced into integrated circuit number 7. This clearly illustrates that a faulty circuit can be expected to result in an abnormal operating temperature and that these abnormalities in temperature can be analyzed to determine which component is causing the problem.

The most practical way of operating the system and in fact the method used to generate the arrays of numbers illustrated in FIGS. 2–6 was to use a general purpose digital computer as the processor. The arrays illustrated in FIGS. 2 through 6 may be produced by a printer controlled by the computer. The digital computer was also used to control the analog-to-digital converter 14. The memory 15 was a part of the computer. The actual program utilized by the experimental system, written in Fortran, is shown below.

```
      COMMON IN1(80,60),IN2(80,60),M(80)
      LL=12
C
C  OPEN DATA CHANNAL
C
      CALL FOPEN(13,"RDATA")
      WRITE(LL,150)
C
C  READ,CONVERT & PRINT REFERENCE DATA
C
      DO 40 J=1,60
      READ(13,100)(IN1(I,J),I=1,80)
      CALL CONVERT(1,J)
 40   CONTINUE
      WRITE(LL,151)
C
C  READ CONVERT, & PRINT TEST DATA
C
      DO 50 J=1,60
      READ(13,100)(IN2(I,J),I=1,80)
      CALL CONVERT(2,J)
 50   CONTINUE
      WRITE(LL,152)
C
C  CALCULATE ABS VALUE OF DIFFERENCES BETWEEN
C  CORRESPONDING ITEMS
C
      DO 80 I=1,60
      DO 70 J=1,80
      IN1(J,I)=IABS(IN1(J,I)-IN2(J,I))
      IF(IN1(J,I) .LE. 1)IN1(J,I)=5
      IF(IN1(J,I) .EQ. 2)GO TO 90
      IF(IN1(J,I) .EQ. 4)IN1(J,I)=2
      GO TO 70
 90   IN1(J,I)=4
 70   CONTINUE
      CALL CONVERT(1,I )
 80   CONTINUE
      WRITE(LL,91)
 91   FORMAT(1H1,'    DATA DESENSITIZED ')
C
C  SCAN FOR STRING OF THREE OR MORE NON NULL ITEMS
C
      DO 1000 I=1,60
      IFLAG=0
      IPT1=1
 200  IF(IN1(IPT1,I) .LT. 5) GO TO 300
      IF(IPT1 .EQ. 80) GO TO 900
      IPT1=IPT1+1
      GO TO 200
 300  ICOUNT =1
      IPT2=IPT1+1
 310  IF(IN1(IPT2,I) .EQ. 5) GO TO 360
      ICOUNT=ICOUNT +1
      IF(IPT2 .EQ. 80) GO TO 350
      IPT2=IPT2+1
      GO TO 310
 350  IFLAG=1
 360  IPT3=IPT2-1
      IF(ICOUNT .LT. 3) GO TO 380
      DO 370 K=IPT1,IPT3
 370  IN1(K,I)=1
      IF(IFLAG .EQ. 1) GO TO 900
      GO TO 384
 380  DO 382 K=IPT1,IPT3
 382  IN1(K,I)=5
 384  IPT1=IPT2
      GO TO 200
 900  CALL CONVERT(1,I)
1000   CONTINUE
C
C
      WRITE(LL,154)
 154  FORMAT(1H1,'    LAYOUT OVERLAY ')
C     NOW READ IN OUTLINE
```

```
      DO 400 J=1,60
      READ(13,110)(IN2(I,J),I=1,80)
 400  CONTINUE
C
C
C
C  COMBINE DESENSITIZED DATA & PATTERN OUTLINE
C
      DO 420 J=1,60
      DO 410 I=1,80
      IF(IN1(I,J) .EQ. 5)IN1(I,J)=' '
      IF(IN1(I,J) .EQ. 1) IN1(I,J)='$'
      IF(IN2(I,J) .NE. '  ')IN1(I,J)=IN2(I,J)
 410   CONTINUE
C
C  PRINT FINAL RESULT
C
      WRITE(LL,120)(IN1(II,J),II=1,80)
 420   CONTINUE
 110   FORMAT(80A1)
 120   FORMAT(1X,80A1)
 100  FORMAT(80I1)
 150  FORMAT(1H1,'    DATA SET 1 ')
 151  FORMAT(1H1,'    DATA SET 2 ')
 152  FORMAT(1H1,'    DIFFERENCE-- DATA SET 1-DATA SET 2 ')
      END

      SUBROUTINE CONVERT(N,NN)
      COMMON IN1(80,60),IN2(80,60),M(80)
C
C  THIS SUBROUTINE CONVERTS A LINE OF NUMERIC DATA
C  TO SYMBOLS AND THEN PRINTS IT
C  ARGUMENTS
C  N=ARRAY #
C  NN=LINE #
C
C
      DO 15 K=1,80
      IF(N .EQ. 1) GOTO 30
      KK=IN2(K,NN)
      GO TO 40
 30   KK=IN1(K,NN)
 40   GOTO(1,2,3,4,5)KK
 1    M(K)='$'
      GOTO 15
 2    M(K)='+'
      GOTO 15
 3    M(K)='-'
      GO TO 15
 4    M(K)= ','
      GO TO 15
 5    M(K)=' '
 15    CONTINUE
      WRITE(12,200)(M(II),II=1,80)
 200  FORMAT(1X,80A1)
      RETURN
```

The system illustrated in FIG. 1 may be assembled from commercially available items. Suitable components are listed by manufacturer and part no. below.

1. The liquid crystal may be type VL-3040 available from Vari-light Corporation.
2. The TV camera may be a Chon Electronics Model No. 2810-200.
3. The analog-to-digital converter may be type No. ADC-H-4B manufactured by Data Systems Corporation.
4. The memory and processor may be combined and be a general purpose digital computer Model No. NOVA 1200 manufactured by Data General Corporation.

The above discussed method for analyzing the video signals may be implemented using analog techniques. Digital techniques were used in the preferred and above discussed system because the current state of hardware development tends to favor digital techniques for applications of this type.

We claim:

1. A method for inspecting a member of a class of related device to determine its operational status, comprising the steps of:

a. coating the surface of a reference member with a first heat sensitive layer to convert heat patterns to light patterns;

b. scanning the surface of said first heat sensitive layer with a light sensitive device to generate a reference signal indicative of the temperature distribution of the surface of said reference member;

c. coating the surface of the member to be inspected with a second heat sensitive layer to convert heat patterns to light patterns;

d. scanning the surface of said second heat sensitive layer with a light sensitive detector to generate a test signal indicative of the temperature distribution of the surface of said member;

e. comparing said reference and test signals to identify difference therebetween;

f. statistically analyzing said difference to determine if said member to be inspected is operating within prescribed limits.

2. The method defined by claim 1 wherein said first and second heat sensitive layers are thin layers of a cholesteric liquid crystal.

3. The method defined by claim 2 wherein said reference signal and said test signal are generated by focusing a TV camera on said first and second heat sensitive layers.

4. The method defined by claim 3 wherein said reference and test signals are similarly sampled and digitized to generate first and second arrays of digited members.

5. The method defined by claim 4 wherein corresponding elements of said first and second arrays of digital numbers are compared to generate a third array, equal to the difference therebetween.

6. Apparatus for inspecting a member of a class of related devices comprising:

a. means for generating a visible display of the temperature gradient across a reference member of said class of related devices;

b. means for scanning said visible display to generate reference data;

c. means for generating a visible display of the temperature gradient across the member of said class of related devices to be inspected;

d. means for scanning the visible display of the temperature gradient across said member of said related devices to generate test data;

e. means for comparing said reference and test data to generate comparison data related to the difference between said reference and test data; and f. means for statistically analyzing said comparison data to determine the operational status by the member being inspected.

7. The apparatus defined by claim 6 wherein said means for generating the visible display of the temperature gradients across said reference member and the member to be inspected includes a thin layer of cholesteric liquid crystal disposed on the surface of said members.

8. The apparatus defined by claim 7 wherein said reference and test data are generated by sampling and digitizing the video output signal of a TV camera focused on said liquid crystal.

9. The apparatus defined by claim 8 wherein said means for statistically analyzing said comparison data includes a digital computer.

* * * * *